United States Patent Office 3,275,503
Patented Sept. 27, 1966

3,275,503
METHOD FOR THE PROTECTION OF LOCI SUSCEPTIBLE TO THE GROWTH OF UNDESIRED MICROORGANISMS
Lawrence F. Marnett and Ralph J. Tenney, Kansas City, Mo., and Jerome B. Thompson, Cumberland, Md., assignors to C. J. Patterson Company, Kansas City, Mo.
No Drawing. Filed Aug. 26, 1964, Ser. No. 392,297
12 Claims. (Cl. 167—22)

The present invention relates to an improved method for the protection of loci susceptible to the growth of undesired microorganisms, such as bacteria and fungi, for instance, molds, mildews and yeasts, against such growth.

The term "undesired microorganisms" is employed herein to signify microorganisms whose growth is undesired in the particular locus to be protected although they might be considered desired microorganisms in other situations.

As is well known, the growth and proliferation of many bacteria molds, mildews and yeasts is undesired in many locations because of deterioration of materials concerned, toxicological hazards, disease causing factors and similar considerations. For example, foods and feedstuffs may be subject to deterioration or spoilage because of growth of bacteria, molds or yeasts therein or thereon or materials, such as textiles, leather and the like, may be subject to deterioration both as to mechanical properties and/or as to appearance because of growth of mildews or molds thereon. Also, certain skin diseases, such as those of the type of athlete's foot are known to be caused or instigated by growth of types of fungi.

It is an object of the invention to provide an improved means for protecting loci susceptible to the growth of undesired microorganisms against such growth.

According to the invention it was unexpectedly found that certain acylated products of α-hydroxy acids are very effective inhibitors of a wide spectrum of selective microorganisms such as molds, mildews, yeasts and bacteria. The acyl lactylic acid products employed according to the invention are of the following general formula $$[RCO(O\overset{A}{\underset{B}{C}}CO)_xO]_mY(OH)_{n-m}$$

wherein RCO is the acyl radical of a fatty acid of from 8 to 12 carbon atoms such as caprylic acid, capric acid, undecanoic acid and lauric acid, Y is a cation, particularly mono or divalent cations, such as hydrogen, alkali metal, alkaline earth metal including magnesium, $n$ signifies the valence of the cation, $m$ is an integer of from 1 to $n$, $x$ is a number from 1 to about 6, preferably 1 to about 3, and each of A and B are hydrogen or methyl, preferably one of A is hydrogen and the other is methyl which means that the product is an acyl lactylic product of the formula $$[RCO(O\overset{CH_3}{\underset{}{C}}HCO)_xO]_mY(OH)_{n-m}$$

The acylated products of α-hydroxy acids concerned according to the invention are produced by methods analogous to that described in U.S. Patent 2,733,252 directed to the production of salts of fatty acid esters of lactylic acids using the appropriate fatty acid and α-hydroxy carboxylic acid. The products in general are mixtures and therefore the values for $x$ and $m$ generally are average values. Nevertheless, separations such as on a chromatographic column can be effected. Also generally even when salts are prepared, in practical scale processes, some free acids are present in the product so that the product normally is slightly acid. Furthermore, the presence of free fatty acids, which has not been esterified with α-hydroxy acid, or their salts along with the acylated products of α-hydroxy acids of the above formula is not deleterious and at most only exerts a diluting action as the fatty acids and salts concerned in some instances possess activity against microorganisms although not as marked or as of broad a spectra as the acylated products according to the invention. In some instances the quantity of free fatty acids or their salts which may be present is such that the composition taken as a whole, that is, free fatty acid or its salt plus the acylated products gives a product in which the value of $x$ is less than 1, for example, about 0.3. Such compositions can be obtained by simple admixture of the free fatty acids or their salts with the acylated products or by preparation of the acylated products using less than 1 mol of α-hydroxy acid per mol of fatty acid.

The procedure employed for the production of the acylated α-hydroxy carboxylic acids involves heating of the fatty acid concerned with the α-hydroxy acid or condensation products thereof in proportions adapted to provide the desired value for $x$ in the presence of more than a catalytic amount of a basic reacting alkali metal or alkaline earth metal compound. When free acid products (Y=H) are desired they are easily prepared by acidification of the products with a dilute mineral acid, such as hydrochloric acid. Such free acid products can also be used in the preparation of various salts by reaction with the appropriate base or metal compound. In defining the products concerned according to the invention, for example, as acyl 2 lactylic products, it is intended to indicate that such product contains an average of about 2 lactyl groups ($x=2$).

The following Tables 1 and 2 illustrate the procedures which can be employed and the properties of the products produced in tabular form.

TABLE 1.—WEIGHTS OF REACTANTS AND REACTION CONDITIONS USED IN THE SYNTHESIS OF SALTS OF ACYL-2 LACTYLIC ACID

| Acid Used | Grams Fatty Acid | Grams Acid | Grams Alkali | | Reaction Time, Hours | Reaction Temperature, °C. |
|---|---|---|---|---|---|---|
| | | Lactic | Carbonate | | | |
| Caprylic acid | 187.5 | 243.3 | (Ca) | 65.0 | 6 | 200 |
| Capric acid | 171.2 | 179.0 | (Ca) | 49.8 | 1½ | 200 |
| Lauric acid | 186.0 | 167.6 | (Ca) | 46.4 | 1½ | 200 |
| Caprylic acid | 187.5 | 234.3 | (Na) | 68.9 | 6½ | 200 |
| Capric Acid | 206.8 | 216.2 | (Na) | 63.6 | 6 | 200 |
| Lauric acid | 1,201.8 | 1,228.6 | (Na) | 318.0 | 1½ | 200 |
| | | Glycolic | Ca(OH)₂ | | | |
| Capric acid | 95.3 | 84.2 | 20.5 | | .2 | 200 |
| | | α-oxyisobutyric | CaCO₃ | | | |
| Capric acid | 68.0 | 71.5 | 19.75 | | 5 | 200 |
| | | Lactic | Ca(OH)₂ | | | |
| Undecanoic acid | 20.0 | 19.8 | 4.1 | | 3 | 195 |

TABLE 2.—ANALYSIS OF PREPARATIONS OF SALTS OF ACYL-2 LACTYLIC ACIDS

|  | pH (2% suspension) | Percent Ca or Na | Acid Value | Ester Value |
|---|---|---|---|---|
| Calcium caprylyl-2 lactylate | 4.5 | 6.6 | 101 | 240 |
| Calcium capryl-2 lactylate | 4.3 | 5.7 | 143 | 172 |
| Calcium undecanoyl-2 lactylate | 4.8 | 7.9 | 60 | 181 |
| Calcium lauryl-2 lactylate | 4.1 | 5.4 | 109 | 132 |
| Sodium caprylyl-2 lactylate | 4.4 | 6.8 | 143 | 190 |
| Sodium capryl-2 lactylate | 4.6 | 6.0 | 134 | 178 |
| Sodium lauryl-2 lactylate | 4.5 | 5.6 | 145 | 138 |
| Calcium capryl-2 glycolate | 3.8 | 8.06 | 149 | 182 |
| Calcium capryl-2 α-oxyisobutyrate | 4.6 | 6.6 | 145 | 74 |

The effectiveness of the acylated α-hydroxy carboxylic acid products according to the invention in inhibiting growth of bacteria, molds and yeasts was evaluated by dispersing each of such compounds at experimental levels in heated culture media composed of Phytone _____ grams__ 10
Dextrose _____ do____ 10
Agar _____ do____ 16
Water _____ liter__ 1

For comparison, culture media containing no additive were included in each series. The culture media was poured into the required 100 mm. by 15 mm. petri dishes. These individual culture plates were inoculated from cultures of the selected microorganisms and incubated for 60 hours at 32° C. At the end of this period, the plates were inspected and the growth of the microorganisms recorded.

Table 3 below gives the results obtained with a 0.1% concentration of the following compounds:

$CaC_8 2L$ = calcium caprylyl-2 lactylate
$CaC_{10} 2L$ = calcium capryl-2 lactylate
$CaC_{11} 2L$ = calcium undecanoyl-2 lactylate
$CaC_{12} 2L$ = calcium lauryl-2 lactylate
$NaC_8 2L$ = sodium caprylyl-2 lactylate
$NaC_{10} 2L$ = sodium capryl-2 lactylate
$NaC_{12} 2L$ = sodium lauryl-2 lactylate
$CaC_{10} 2G$ = calcium capryl-2 glycolate
$CaC_{10} 2$-α-$O$ = calcium capryl-2-α-oxyisobutyrate Tests carried out with other salts, such as, for example, zinc and aluminum salts, and with the free acids (Y=H) showed an effectiveness similar to that of the alkali and alkaline earth metal salts, indicating that the acyl lactylate anion is responsible for the effectiveness. In addition, it was found that those compounds wherein $x$ is 1 to 3 have higher effectiveness than when $x$ is higher, for example 6, especially in the case of the capryl lactylates.

The pH at which the compounds employed according to the invention are most effective depends upon the particular microorganism concerned. While they show excellent effectiveness at pH values in the alkaline range, for example, 8.5, against some microorganisms their effectiveness against the broadest spectrum of microorganisms is in the acid range, particularly at pH values below 6.5.

Excellent inhibition of yeasts other than *Saccharomyces cerevisiae* is also obtained as indicated by the following results obtained with calcium capryl-2 lactylate at a 0.1% level.

|  | Control | 0.1% calcium capryl-2 lactylate |
|---|---|---|
| *Endomycopsis fibuliger* | ++++ | 0 |
| *Haferula californica* | ++++ | Trace |
| *Saccharomyces lactus* | ++++ | 0 |
| *Endomyces lactus* | ++++ | 0 |

The improved effectiveness of the compounds according to the invention over that of known inhibitors is illustrated by the following table.

TABLE 4.—LEVEL 0.1% OF THE CULTURE MEDIA

|  | Control | Sorbic Acid | Sodium Benzoate | Sodium Propionate | Calcium Capryl-2 Lactylate |
|---|---|---|---|---|---|
| *Staphylococcus aureus* | ++++ | + | +++ | ++++ | 0 |
| *Bacillus mesentericus* | ++++ | 0 | +++ | +++ | 0 |
| *Rhizopus nigricans* | ++++ | ++++ | ++++ | +++ | + |
| *Penicillum xpansum* | ++++ | + | ++++ | ++++ | 0 |
| *Aspergillus niger* | ++++ | 0 | +++ | ++++ | ++ |
| *Trichophyton mentagrophytes* | ++++ | 0 | + | ++++ | 0 |
| *Saccharomyces cerevisiae* | ++++ | 0 | ++ | ++++ | 0 |
| *Aspergillus terreus* | ++++ | 0 | +++ | +++ | ++ |

The acylated products of α-hydroxy carboxylic acids employed according to the invention as undesired microorganism growth inhibitors can be mixed with the materials or products to be protected or such materials may be impregnated or coated therewith. In many instances it is merely necessary, for example, to impregnate wrappers for goods to be protected against growth of microorganisms, for example, wrappers for cheese products with the inhibitor compounds of the invention. For treatment and prevention of diseases of, for example, the skin caused by microorganisms, the inhibitor compounds can be applied topically to the areas affected in the form of dusting powders, ointments, salves or solutions. In general, the various modes of application of the inhibitor compounds according to the invention involves close association with the locus to be protected against growth of undesired microorganisms. Of course, when protection of food products and contact or association with liv-

TABLE 3.—LEVEL 0.1% OF THE CULTURE MEDIA

|  | Control | $CaC_8 2L$ | $CaC_{10} 2L$ | $CaC_{11} 2L$ | $CaC_{12} 2L$ | $NaC_8 2L$ | $NaC_{10} 2L$ | $NaC_{11} 2L$ | $CaC_{10} 2G$ | $CaC_{10} 2αO$ |
|---|---|---|---|---|---|---|---|---|---|---|
| *Staphylococcus aureus* | ++++ | 0 | 0 | 0 | 0 | 0 | 0 | 0 | 0 | 0 |
| *Bacillus mesentericus* | ++++ | 0 | 0 | 0 | 0 | 0 | 0 | 0 | 0 | + |
| *Rhizopus nigricans* | ++++ | +++ | + | +++ | ++ | +++ | +++ | +++ | +++ | +++ |
| *Penicillium xpansum* | ++++ | 0 | 0 | ++ | ++ | 0 | 0 | 0 | 0 | 0 |
| *Aspergillus niger* | ++++ | +++ | ++ | ++ | ++ | ++ | ++ | ++ | ++++ | 0 |
| *Trichophyton mentagrophytes* | ++++ | 0 | 0 | + | + | 0 | 0 | 0 | 0 | 0 |
| *Saccharomyces cerevisiae* | ++++ | 0 | 0 | 0 | 0 | 0 | 0 | 0 | +++ | 0 |
| *Aspergillus terreus* | ++++ | +++ | ++ | ++ | ++ | +++ | ++ | +++ | 0 | + | ing bodies is concerned, it is understood that the cation of the inhibitor compound is not such as to render such compound toxic during its intended use.

The practical effectiveness of the compounds employed according to the invention is illustrated by the following examples.

*Example 1.—The inhibition of the growth of* Staphylococcus aureus *in custard pie filling*

A premix containing all the dry ingredients for a custard pie filling was prepared according to the following formula:

| | Parts |
|---|---|
| Sugar | 42.5 |
| Non-fat milk solids | 21.2 |
| Corn starch | 13.3 |
| Dried whole eggs | 21.0 |
| Salt | 0.7 |
| Vanilla | 1.3 |

Seven sample pie fillings were prepared from the premix. The inhibitors, calcium capryl-2 lactylate and sorbic acid, were added to suspensions of the ingredients in water. Since pH frequently effects the performance of inhibitors in foods, the two inhibitors were compared at three different pH levels. Citric acid, a commonly used food additive which also occurs naturally in foods, was used as the acidulant and was added to the fillings at levels shown. The fillings were cooked over steam until the consistency was similar to custard. The seven filling variables were as follows:

FORMULATION OF EXPERIMENTAL PIE FILLINGS USED TO STUDY *STAPHYLOCOCCUS AUREUS* INHIBITION

| Filling Identification | Weight Dry Mix, g. | Weight Water, g. | Weight Citric Acid, g. | Weight Calcium Capryl-2 Lactylate, g. | Weight Sorbic Acid, g. |
|---|---|---|---|---|---|
| 1 | 30 | 70 | 0 | 0 | 0 |
| 2 | 30 | 70 | 0 | 0.2 | 0 |
| 3 | 30 | 70 | 0 | 0 | 0.2 |
| 4 | 30 | 70 | 0.1 | 0.2 | 0 |
| 5 | 30 | 70 | 0.3 | 0.2 | 0 |
| 6 | 30 | 70 | 0.1 | 0 | 0.2 |
| 7 | 30 | 70 | 0.3 | 0 | 0.2 |

The pH of these fillings was measured and each inoculated with one loop full of a twenty-four hour culture of *Staphylococcus aureus*. Earlier work using this method of inoculation has indicated that the microorganisms contained in one loop full is equivalent to 20,000 to 22,000 bacteria per gram pie filling. After incubating twenty-four hours, portions of each filling were diluted one part to one hundred parts agar culture media and poured into petri dishes. The colonies that developed were counted and the results calculated to show microorganisms per gram of inoculated filling. The counts were:

EFFECTIVENESS OF CALCIUM CAPRYL-2 LACTYLATE AND SORBIC ACID ON THE INHIBITION OF *STAPHYLOCOCCUS AUREUS* IN CUSTARD PIE FILLINGS

| Filling Identification | Filling pH | Bacteria per gram Filling |
|---|---|---|
| 1. No additive | 6.4 | 235,000,000 |
| 2. 0.2% Calcium Capryl-2 Lactylate | 6.1 | 5,000,000 |
| 3. 0.2% Sorbic Acid | 6.1 | 22,000,000 |
| 4. 0.2% Calcium Capryl-2 Lactylate | 5.1 | 1,800 |
| 5. 0.2% Calcium Capryl-2 Lactylate | 4.85 | Less than 100 |
| 6. 0.2% Sorbic Acid | 5.15 | 6,000 |
| 7. 0.2% Sorbic Acid | 4.8 | 4,700 |

*Example 2.—Inhibition of mildew development of canvas by impregnating canvas with calcium capryl-2 lactylate*

Canvas was cut into eight sections, six inches by six inches, soaked and washed in a detergent, well rinsed and dried. Seven sections were dipped in ethanol solutions of 20%, 10%, 5%, 2.5% and 1% calcium capryl-2 lactylate and 5% and 1% sodium benzoate by weight. The excess solution was squeezed out and the canvas sections allowed to dry over night. The eight sections were buried under about one inch of soil contained in a large pan. Water was added periodically to keep soil and canvas moist and to insure the development of mildew by the soil micro-organisms.

After thirty days the canvas was removed from the soil, carefully washed and examined. The condition of the cloth, according to treatment, was rated as follows:

First: (best condition) 20% calcium capryl-2 lactylate
Second: 10% calcium capryl-2 lactylate
Third: 5% calcium capryl-2 lactylate
Fourth: 2.5% calcium capryl-2 lactylate
Fifth: 1% calcium capryl-2 lactylate and 5% benzoate
Sixth: 1% sodium benzoate and the untreated control 63 mm. strips of each canvas section were tested on the Elmendorf Tearing Tester, a standard instrument used by the paper industry. The instrument's graduations are used as an index of resistance to tearing. The results were:

| Canvas treatment: | Elmendorf units |
|---|---|
| 20% calcium capryl-2 lactylate | Over 100. |
| 10% calcium capryl-2 lactylate | Over 100. |
| 5% calcium capryl-2 lactylate | Over 100. |
| 2.5% calcium capryl-2 lactylate | 55. |
| 1% calcium capryl-2 lactylate | 35. |
| 5% sodium benzoate | 19. |
| 1% sodium benzoate | 12. |
| Control, no treatment | 8. |

The high resistance to tearing shown by the canvas treated with the capryl lactylate indicated this treatment reduced rotting of the fabric. The capryl lactylate is more effective than sodium benzoate.

*Example 3.—Prevention of mold development on packaged cheese with the use of calcium capryl-2 lactylate*

Brown kraft paper was cut into three and a half inch squares. Four squares were dipped in ethanol; four in 10% by weight calcium capryl-2 lactylate in ethanol; four in 10% by weight suspension of sorbic acid in ethanol; four were not treated. The sheets were dried until no odor of ethanol was detected in the paper. These paper squares and twelve slices of American cheese, containing no preservative, were spread on a table and exposed to air borne mold spores for thirty minutes. Each set of four squares was placed between, above and below, three slices of cheese. These sets were sealed in polyethylene bags and stored at room temperature.

The packages were inspected periodically and the dates on which the first mold growth and mold coverage appeared was recorded. Mold was first noted after four days in the packages containing the untreated paper and the paper treated only with ethanol. In seven more days these two packages were covered with mold. No mold developed in the package containing papers treated with calcium capryl-2 lactylate and the sorbic acid.

*Example 4.—Inhibition of mold growth on partially baked dinner rolls by application of calcium capryl-2 lactylate*

Partially baked dinner rolls were prepared according to commercial formulas and procedures. Forty-eight rolls were prepared and divided into four groups of twelve rolls. Each group was treated as follows:
(1) Control, no treatment
(2) Dipped in 1% calcium propionate by weight in ethanol
(3) Dipped in 1% calcium capryl-2 lactylate by weight in ethanol
(4) Dipped in 2% calcium capryl-2 lactylate by weight in ethanol The rolls were treated as soon after baking as possible and after treatment shown above were spread on a rack for thirty minutes to allow inoculation by air borne mold spores. The rolls were then wrapped and sealed in cellophane packages, twelve to the package and stored at room conditions. Periodically the rolls were inspected and the time in days for the appearance of the first mold colony, multiple colonies and complete mold coverage was recorded. The results were:

STUDIES OF THE MOLD INHIBITING EFFECT OF CALCIUM CAPRYL-2 LACTYLATE ON PARTIALLY BAKED DINNER ROLLS

| Package Identification | Time in Days for the Development of— | | |
|---|---|---|---|
| | First Colony | Multiple Colonies | Complete Coverage |
| Control | 10 | 12 | 14 |
| 1% Calcium Propionate | 19 | 24 | |
| 1% Calcium capryl-2 lactylate | No mold development after 30 days | | |
| 2% Calcium capryl-2 lactylate | No mold development after 30 days | | |

*Example 5.—The inhibition of mold growth on leather with calcium capryl-2 lactylate*

Five strips of leather approximately one by three inches, were soaked and washed in a detergent, rinsed and dried. The strips were dipped in the following solutions:
(1) Ethanol (control)
(2) 1% calcium capryl-2 lactylate in ethanol
(3) 2.5% calcium capryl-2 lactylate in ethanol
(4) 1% benzoic acid in ethanol
(5) 2.5% benzoic acid in ethanol The excess solution was blotted from the strips with filter paper. The leather was suspended from a wire in the room for twenty-four hours to allow the ethanol to evaporate and to inoculate the leather with air borne spores. The strips were incubated by hanging them in a large jar. Water was placed in the bottom of the jar to insure high humidity during the storage period.

The leather was examined periodically for evidence of mold growth. The results of this experiment were:

| Leather Treatment | Mold Growth During Storage for— | | | | |
|---|---|---|---|---|---|
| | 60 days | 90 days | 100 days | 110 days | 120 days |
| Ethanol (control) | (¹) | (²) | (³) | (³) | (³) |
| 1% calcium capryl-2 lactylate | 0 | 0 | 0 | (¹) | (²) |
| 2.5% calcium capryl-2 lactylate | 0 | 0 | 0 | 0 | (²) |
| 1% benzoic acid | 0 | 0 | (¹) | (²) | (³) |
| 2.5% benzoic acid | 0 | 0 | 0 | (²) | (³) |

¹ One colony.  ² Multiple colonies.  ³ Covered.

*Example 6.—Tests studying the action of calcium capryl-2 lactylates on skin fungi*

Three people voluntarily served as test subjects to determine the effectiveness of calcium capryl-2 lactylate in treating cases of skin fungi. One case was a fungus infection in the auditory canal, the other two were athlete's foot.

For treatment of these infections an ointment and a powder were prepared. The ointment consisted of 10% calcium capryl-2 lactylate dissolved in petroleum jelly formed by melting the two materials together and stirring until cool. The powder was formed by preparing an ethanol solution of the lactylate and stirring this solution into talcum powder until a paste was formed. The ethanol was evaporated and the powder passed through a 60 mesh screen to break up lumps. The finished powder contained 2.5% calcium capryl-2 lactylate by weight.

The ointment was used in the treatment of the infection in the auditory canal and the powder was used in the treatment of athlete's foot. In each instance after single daily applications for one week complete symptomatic relief was obtained.

We claim:

1. A method for the protection of loci susceptible to the growth of undesired microorganisms against such growth which comprises subjecting such loci to an effective amount of an acylated product of an α-hydroxy carboxylic acid of the formula

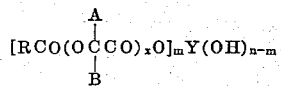

wherein RCO is an acyl radical of a fatty acid of from 8 to 12 carbon atoms, each of A and B are selected from the group consisting of hydrogen and methyl, Y is a cation, $x$ as an average is a number between about 0.3 and 6, $n$ is an integer equal to the valence of the cation Y and $m$ is a number from 1 to $n$.

2. A method for the protection of loci susceptible to the growth of undesired microorganisms against such growth which comprises subjecting such loci to an effective amount of an acylated product of an α-hydroxy carboxylic acid of the formula

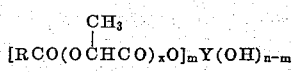

wherein RCO is an acyl radical of a fatty acid of from 8 to 12 carbon atoms, Y is a cation, $x$ as an average is a number between 0.3 and 3, $n$ is an integer equal to the valence of the cation Y and $m$ is a number from 1 to $n$.

3. A method for the protection of loci susceptible to the growth of undesired microorganisms against such growth which comprises subjecting such loci to an effective amount of an acylated product of an α-hydroxy carboxylic acid of the formula

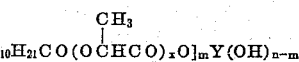

wherein Y is a cation, $x$ is a number between 1 and 3, $n$ is an integer equal to the valence of the cation Y and $m$ is a number from 1 to $n$.

4. A method for the protection of loci susceptible to the growth of undesired microorganisms against such growth which comprises subjecting such loci to an effective amount of an alkali metal capryl lactylate containing an average of 1 to 3 lactylic groups.

5. A method for the protection of loci susceptible to the growth of undesired microorganisms against such growth which comprises subjecting such loci to an effective amount of an alkaline earth metal capryl lactylate containing an average of 1 to 3 lactylic groups.

6. A method for the protection of loci susceptible to the growth of undesired microorganisms against such growth which comprises subjecting such loci to an effective amount of capryl lactylic acid containing an average of 1 to 3 lactylic groups.

7. A method for the protection of loci susceptible to the growth of undesired microorganisms against such growth which comprises subjecting such loci to an effective amount of calcium capryl lactylate containing an average of 1 to 3 lactylic groups.

8. A method for the protection of loci susceptible to the growth of undesired microorganisms against such growth which comprises subjecting such loci to an effective amount of calcium capryl-2 lactylate.

9. A method for the protection of foodstuff susceptible to the growth of undesired microorganisms against such growth which comprises subjecting such foodstuff to an effective amount of a non-toxic acylated product of an α-hydroxy carboxylic acid of the formula

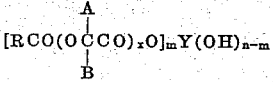

wherein RCO is an acyl radical of a fatty acid of from 8 to 12 carbon atoms, each of A and B are selected from the group consisting of hydrogen and methyl, Y is a cation, $x$ as an average is a number between 0.3 and 6, $n$ is an integer equal to the valence of the cation Y and $m$ is a number from 1 to $n$.

10. A method for the protection of foodstuff susceptible to the growth of undesired microorganisms against such growth which comprises incorporating in such foodstuff an effective amount of a non-toxic acylated product of an α-hydroxy carboxylic acid of the formula

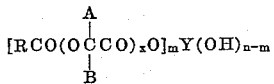

wherein RCO is an acyl radical of a fatty acid of from 8 to 12 carbon atoms, each of A and B are selected from the group consisting of hydrogen and methyl, Y is a cation, $x$ as an average is a number between 0.3 and 6, $n$ is an integer equal to the valence of the cation Y and $m$ is a number from 1 to $n$.

11. A method for the protection of foodstuff susceptible to the growth of undesired microorganisms against such growth which comprises coating such foodstuff with an effective amount of a non-toxic acylated product of an α-hydroxy carboxylic acid of the formula

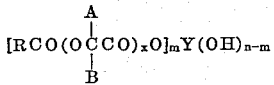

wherein RCO is an acyl radical of a fatty acid of from 8 to 12 carbon atoms, each of A and B are selected from the group consisting of hydrogen and methyl, Y is a cation, $x$ as an average is a number between 0.3 and 6, $n$ is an integer equal to the valence of the cation Y and $m$ is a number from 1 to $n$.

12. A method for the protection of foodstuff susceptible to the growth of undesired microorganisms against such growth which comprises wrapping such foodstuff in a sheet of material carrying uniformly distributed over the area thereof an effective amount of a non-toxic acylated product of an α-hydroxy carboxylic acid of the formula

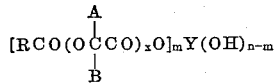

wherein RCO is an acyl radical of a fatty acid of from 8 to 12 carbon atoms, each of A and B are selected from the group consisting of hydrogen and methyl, Y is a cation, $x$ as an average is a number between 0.3 and 6, $n$ is an integer equal to the valence of the cation Y and $m$ is a number from 1 to $n$.

References Cited by the Examiner

UNITED STATES PATENTS

| | | | |
|---|---|---|---|
| 1,772,975 | 8/1930 | Wieland | 167—22 |
| 2,379,294 | 6/1945 | Gooding | 99—224 |
| 2,466,663 | 4/1949 | Russ et al. | 167—58 |
| 2,733,252 | 1/1956 | Thompson et al. | 260—410.9 |
| 2,744,825 | 5/1956 | Thompson et al. | 99—91 |
| 2,744,826 | 5/1956 | Thompson et al. | 99—93 |
| 2,789,992 | 4/1957 | Thompson et al. | 260—410.9 |
| 3,033,686 | 5/1962 | Landfried et al. | 99—91 |
| 3,141,030 | 7/1964 | Buddemeyer et al. | 260—410.9 |
| 3,146,110 | 8/1964 | Buddemeyer et al. | 99—94 |

LEWIS GOTTS, *Primary Examiner.*

S. K. ROSE, *Assistant Examiner.*